(12) United States Patent
Li et al.

(10) Patent No.: US 9,018,919 B2
(45) Date of Patent: Apr. 28, 2015

(54) BATTERY DETECTOR FOR PORTABLE ELECTRONIC DEVICE AND METHOD THEREOF

(75) Inventors: Cheng-Yi Li, Hsinchu Hsien (TW); Kun-Wei Tseng, Hsinchu Hsien (TW); Yi-Wei Wang, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 986 days.

(21) Appl. No.: 13/154,391

(22) Filed: Jun. 6, 2011

(65) Prior Publication Data

US 2012/0078551 A1 Mar. 29, 2012

(30) Foreign Application Priority Data

Sep. 23, 2010 (TW) .............................. 099132226 A

(51) Int. Cl.
*H02J 7/06* (2006.01)
*H02J 7/00* (2006.01)

(52) U.S. Cl.
CPC ................................. *H02J 7/0047* (2013.01)

(58) Field of Classification Search
CPC ...... H02J 7/0031; H02J 7/0036; H02J 7/0047
USPC .................. 320/106, 107, 114, 159, 164, 165
See application file for complete search history.

(56) References Cited

U.S. PATENT DOCUMENTS

| 5,717,307 | A * | 2/1998 | Barkat et al. ................ 340/636.1 |
| 6,888,354 | B1 * | 5/2005 | Gofman ......................... 324/427 |
| 2006/0152194 | A1 * | 7/2006 | Wang et al. .................... 320/121 |

\* cited by examiner

*Primary Examiner* — Edward Tso
*Assistant Examiner* — Aaron Piggush
(74) *Attorney, Agent, or Firm* — Han IP Corporation

(57) ABSTRACT

Various embodiments of a battery detector are provided. In one aspect, a battery detector of a portable electronic device is applied to a battery module without an identification (ID) terminal. When the portable electronic device receives a direct current (DC) voltage provided by an external transformer to conduct a startup procedure, the battery detector detects whether the battery module is connected to the portable electronic device or not, and prevents the portable electronic device from conducting erroneous operations.

4 Claims, 2 Drawing Sheets

BATTERY DETECTOR FOR PORTABLE ELECTRONIC DEVICE AND METHOD THEREOF

CROSS-REFERENCE TO RELATED PATENT APPLICATIONS

This patent application is based on Taiwan, R.O.C. Patent Application No. 099132226 filed on Sep. 23, 2010, which is herein incorporated in its entirety by reference.

BACKGROUND

1. Technical Field

The present disclosure relates to a battery detector for a portable electronic device, and more particularly, to a battery detector for detecting whether a battery module is coupled to a portable electronic device or not but without utilizing an internal resistor of the battery module.

2. Description of Related Art

Generally, portable electronic devices, such as a mobile phone or a personal digital assistant (PDA), need an external battery module for providing power to the portable electronic device. Except a positive terminal (+) and a negative terminal (−), a conventional battery module including the chargeable battery further comprises an identification (ID) terminal. In this configuration, an internal thermistor is coupled between the ID terminal and the negative terminal.

Taking a mobile phone as an example, when the battery module is coupled to the mobile phone, a control circuit of the mobile phone determines the battery module is coupled to the mobile phone according to a logical level detected at the ID terminal. If the control circuit detects that the ID terminal is at a logic low level, it is determined that the battery module is coupled to the mobile phone; On the contrary, if the control circuit is unable to detect that the ID terminal is at the logic low level, it is determined that the battery module is not coupled to the mobile phone.

Alternatively, the control circuit of the mobile phone can provide a control voltage to the ID terminal and obtains a corresponding current to calculate the resistance of the thermistor to further determine a temperature of the battery module. The control circuit of the mobile phone also determines whether the battery module is coupled to the mobile phone according to whether the corresponding current is generated.

Generally, manufacturer usually binds a transformer capable of providing matched direct current (DC) power to the mobile phone as accessory in a shipping package. When the mobile phone is not turned on yet and the transformer is plugged in the mobile phone for providing a DC power, the control circuit of the mobile phone conducts a startup procedure and determines whether the battery module is coupled to the mobile phone. After the electrical connection state between the mobile phone and the battery module is confirmed, a charger of the mobile phone is turned on for charging the battery module.

However, for the purpose of reducing cost, module manufactures no longer design the ID terminal in the battery module at present. Therefore, when the mobile phone receives the DC power provided from the transformer, the control circuit of the mobile phone cannot determine whether the battery module is coupled to the mobile phone. Thereby, erroneous operations happen in the startup procedure of the mobile phone.

For example, a liquid crystal display (LCD) panel of the mobile phone would be turned on during the startup procedure of the mobile phone. When power of the mobile phone is provided by the battery module or by the battery module together with the transformer at the same time, the mobile phone should get enough work current. Therefore, the LCD panel of the mobile phone is lightened and the startup procedure would be conducted smoothly.

On the contrary, when power of the mobile phone is provided by the transformer only, in the moment of lightening the LCD panel during the startup procedure, the entire mobile phone would be shut down if the charging current supplied by the transformer cannot support enough work current for the mobile phone. Therefore, the startup procedure would fail. After that, once the mobile phone is shut down, since the LCD panel no longer consumes power, the charging current supplied by the transformer is provided to the mobile phone again for conducting the startup procedure until the mobile phone is shut down once more when the LCD panel is lightened again. Accordingly, the LCD panel of the mobile phone presents repeatedly lightening and darkening behaviors in the view of user. Therefore, the panel is non-functional under such circumstance.

As mentioned above, if the mobile phone is not coupled to the battery module and only the DC voltage of the transformer is provided to the mobile phone, malfunctions may occur in the mobile phone when the control circuit of the mobile phone peremptorily starts the charger because the control circuit of the mobile phone cannot determine whether the battery module is connected to the mobile phone.

SUMMARY

An object of the present disclosure is to provide a battery detector for a portable electronic device, capable of applied to a battery module without an ID terminal. When the portable electronic device receives the DC voltage provided by an external transformer, the portable electronic device can still determines whether the battery module is coupled to the portable electronic device so as to prevent erroneous operations of the portable electronic device.

Therefore, according to an embodiment of the present disclosure, a battery detector of a portable electronic device is provided. The battery detector comprises a charger, coupled to an external transformer, for receiving a DC voltage; a first voltage terminal coupled to a battery module; a metal-oxide-semiconductor (MOS) switch, coupled between the charger and the first voltage terminal, configuring electrical connection states between the charger and the first end of the detecting resistor as a close state or an open state according to an enable signal; a voltage detector, coupled to the first voltage terminal, asserting a hardware signal when a first voltage is higher than a threshold voltage, and de-asserting the hardware signal when the first voltage is lower than the threshold voltage; a microcontroller with an input/output (I/O) port, coupled to the voltage detector, asserting a software signal at the I/O port when the microcontroller receives the first voltage; and an enable control circuit, receiving the hardware signal and the software signal, generating the enable signal to control the MOS switching into the open state when the hardware signal or the software is asserted wherein the microcontroller de-asserts the software signal to determine electrical connection states of the battery module according to the first voltage detected by the voltage detector during a predetermined period.

According to another embodiment, a battery detector of a portable electronic device comprises a charger coupled to an external transformer to receive a DC voltage; a detecting resistor; an MOS switch, coupled between the charger and a first end of the detecting resistor, configuring electrical connection states between the charger and the first end of the detecting resistor as a close state or an open state according to an enable signal; a first voltage terminal coupled to a second end of the detecting resistor; a voltage detector, coupled to the first voltage terminal, asserting a hardware signal when a first voltage is higher than a threshold voltage and de-asserting the hardware signal when the first voltage is lower than the threshold voltage; a current detector coupled to the first end and the second end of the detecting resistor to detect a charging current of the detecting resistor; a microcontroller with an I/O port, coupled to the voltage detector, asserting a software signal at the I/O port when the microcontroller receives the first voltage; and an enable control circuit receiving the hardware signal and the software signal and generating the enable signal to control the MOS switching into the close state when the hardware signal or the software signal is asserted, wherein the microcontroller de-asserts the software signal to determine electrical connection states of the battery module during a predetermined period according to the charging current detected by the current detector.

According to still another embodiment of the present disclosure, a battery detecting method for a portable electronic device, the portable electronic device selectively connecting to an external battery module or an external transformer, and comprising a charging path coupled to a first voltage terminal through a switch; a voltage detector, coupled to the first voltage terminal, asserting a hardware signal when a first voltage is higher than a threshold voltage and de-asserting the hardware signal when the first voltage is lower than the threshold voltage; a microcontroller with an I/O port, coupled to the voltage detector, asserting a software signal; and an enable control circuit generating an enable signal to control the switch into a close state when the hardware signal or the software signal is asserted; wherein the external transformer connects to the charging path and the battery module connects to the first voltage terminal, the battery detecting method for the portable electronic device comprising asserting the software signal at the I/O port when the microcontroller receives the first voltage; de-asserting the software signal during a predetermined period by the microcontroller; determining the battery module is not coupled to the portable electronic device when the first voltage is lower than the threshold voltage; and determining the battery module is coupled to the portable electronic device when the first voltage is not lower than the threshold voltage.

According to yet another embodiment of the present disclosure, a battery detecting method for a portable electronic device coupled to the an external battery module or an external transformer, comprising a charger coupled to the external transformer to receive a DC voltage, a detecting resistor, an MOS switch, coupled between the charger and a first end of the detecting resistor, configuring electrical connection states between the charger and the first end of the detecting resistor as a close state or an open state according to an enable signal, a first voltage terminal coupled to a second end of the detecting resistor, a voltage detector, coupled to the first voltage terminal, asserting a hardware signal when a first voltage is higher than a threshold voltage and de-asserting the hardware signal when the first voltage is lower than the threshold voltage, a current detector coupled to the first end and the second end of the detecting resistor to detect a charging current of the detecting resistor, a microcontroller with an I/O port, coupled to the voltage detector, asserting a software signal at the I/O port when the microcontroller receives the first voltage, an enable control circuit receiving the hardware signal and the software signal and generating the enable signal to control the MOS switching into the close sate when the hardware signal or the software signal is asserted, the battery detecting method of the portable electronic device comprising asserting the software signal at the I/O port when the microcontroller receivers the first voltage; de-asserting the software signal by the microcontroller during a predetermined period; determining the battery module is not coupled to the portable electronic device when the charging current is generated; and determining the battery module is coupled to the portable electronic device when the charging current is not generated.

Following description and figures are disclosed to gain a better understanding of the advantages of the present disclosure.

DETAILED DESCRIPTION OF THE PREFERRED EMBODIMENTS

Figure 1:
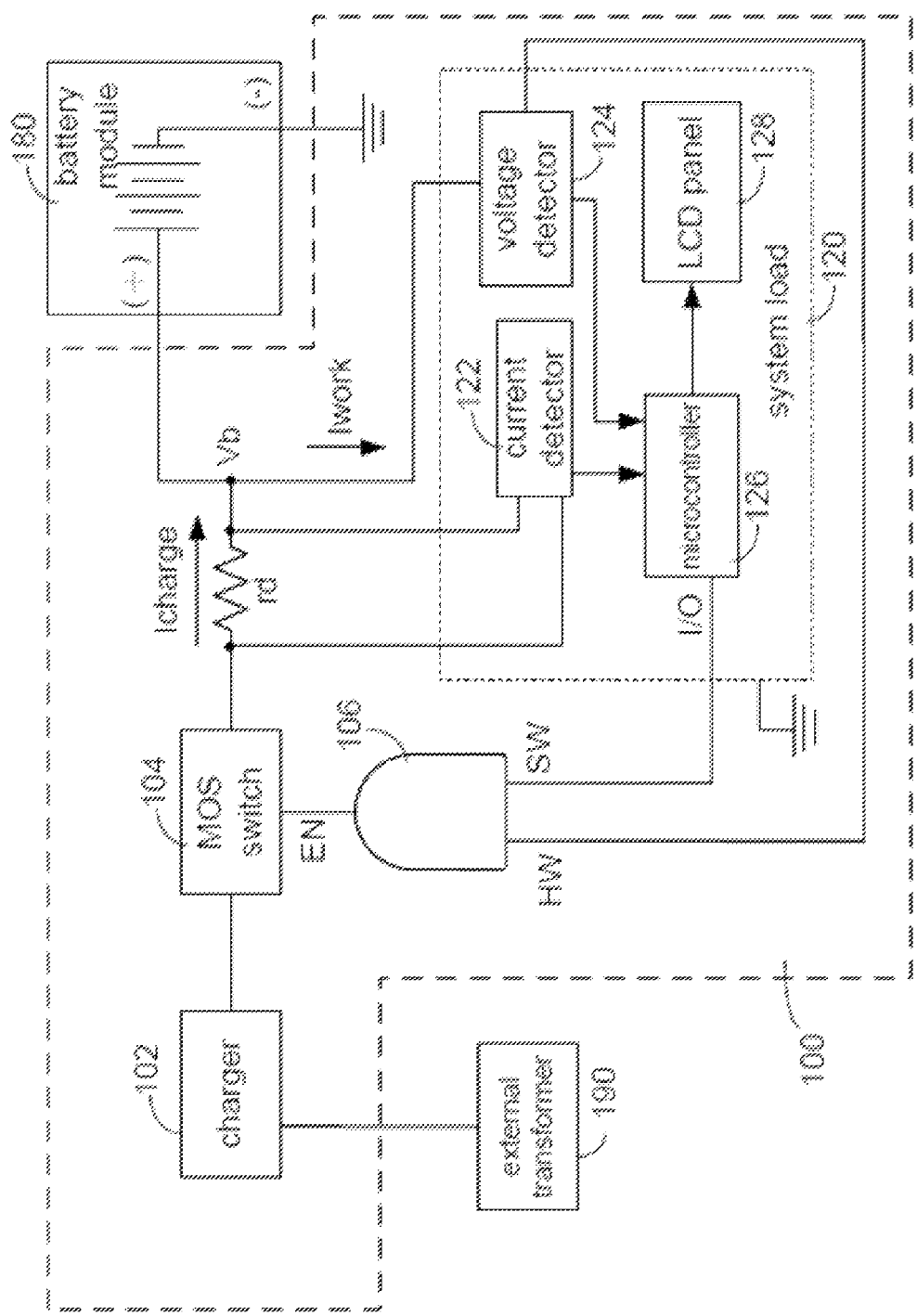
FIG. 1 is a schematic diagram of a battery detector of a portable electronic device and a battery module thereof in accordance with an embodiment of the present disclosure.

FIG. 1 is a schematic diagram of a battery detector of a portable electronic device and a battery module thereof in accordance with an embodiment of the present disclosure. A portable electronic device 100 is capable of coupled to a battery module 180, and also coupled to an external transformer 190 to receive a DC power. The portable electronic device 100 comprises a charger 102, a MOS switch 104, a detection resistor rd, a control circuit 106, and a system load 120. For enabling the portable electronic device, the charger 102 electrically connects to the transformer 190 to receive the DC voltage. The MOS switch 104 connects between a first end of the detection resistor $r_d$ and the charger 102 to controls an electrical connection state between the charger 102 and the detection resistor $r_d$ according to an enable signal. A second end of the detection resistor $r_d$ is connected to the system load 120 and a positive end of the battery module 180, and a voltage at the positive end is defined as $V_b$. In this embodiment, the enable control circuit 106 is an AND gate capable of receiving a hardware signal HW and a software signal SW to generate an enable signal EN.

The system load 120 comprises a current detector 122, a voltage detector 124, a microcontroller 126, and an LCD panel 128. Power for supplying components of the foregoing system load 120 is provided by the battery module 180 or the charger 102. The current detector 122 connects to both ends of the detection resistor $r_d$ to calculate a charging current $I_{charge}$ according to the voltage of the detection resistor rd. The voltage detector 124 connects to the second end of the detecting resistor $r_d$ and detects the voltage $V_b$ and asserts a hardware signal HW. The microcontroller 126, having an I/O port for asserting a software signal SW, connects to the current detector 122 and the voltage detector 124 and further electrically connects to the LCD panel 128 for controlling the LCD panel 128.

For example, the maximum voltage of the battery module 180 under working circumstances is 4.2V, and the charger 102 can also provide a 4.2 Volt voltage. When the voltage $V_b$ is lower than a threshold voltage, e.g., a value between 3.2V and 2.8V, the voltage detector 124 generates a logic low hardware signal HW accordingly; Otherwise, when the voltage $V_b$ is higher than the threshold voltage, the voltage detector 124 generates a hardware signal HW with a logic high level.

In this embodiment of the present disclosure, when the system load 120 receives power for initiating the microcontroller 126 to conduct a startup procedure, the microcontroller 126 cannot determine whether power is provided by the battery module 180 or the charger 102. Therefore, in a firmware program of the microcontroller 126, the software signal SW at the I/O port is defined at the logic low level to initiate the enable signal EN and to ensure the MOS switching into the close state. Accordingly, the charger 102 is capable of providing power to the system load 120 with the voltage $V_b$ higher than 3.2V. The voltage detector 124 generates the logic high hardware signal HW and simultaneously records the value of the voltage $V_b$ under the logic high hardware signal HW.

After that, upon the microcontroller 126 is configured at the logic high level during a predetermined period, the software signal SW at the I/O port is re-configured at the logic low level. That is, during the predetermined period, the enable signal EN is deactivated, and the MOS switch is at the open state. At this point, two situations described below would occur.

When the battery module 180 is not coupled to the portable electronic device 100, the voltage $V_b$ is rapidly decreased during the predetermined period. When the voltage $V_b$ is decreased till a threshold voltage $V_{th}$, the voltage detector 124 generates the logic low hardware signal HW to initiate the enable signal EN again, and force the MOS switch 104 turns into the close state. The charging current $I_{charge}$ provided by the charger 102 is a work current Iwork for maintaining operations of the microcontroller 126. At this stage, the microcontroller 126 detects that the charging current $I_{charge}$ is generated through the current detector 122. It means, during the predetermined period, when the current detector 122 detects the charging current $I_{charge}$ and the voltage $V_b$ is higher than threshold voltage $V_{th}$ before the predetermined period, it is determined that the battery module 180 is not coupled to the portable electronic device 100. Similarly, when the voltage detector 124 detects that the voltage $V_b$ is lower than the threshold voltage $V_{th}$, it is determined that the battery module 180 is not coupled to the portable electronic device 100 as well.

When the battery module 180 is coupled to the portable electronic device 100, the voltage $V_b$ is not decreased during the predetermined period. Therefore, the hardware signal HW of the voltage detector 124 and the software signal SW at the I/O port are at the logic high level to deactivate the enable signal EN. Moreover, the hardware signal HW of the voltage detector 124 and the software signal SW at the I/O port are at the logic high level to maintain the MOS switch being in the open state and prevent the generation of the charging current $I_{charge}$ as well. The working current $I_{work}$ is provided by the battery module 180 to maintain operations of the microcontroller 126. It means, during the predetermined period, when the current detector 122 fails to detect the charging current $I_{charge}$, it is determined that the battery module 180 is coupled to the portable electronic device 100. Similarly, when the voltage detector 124 detects that the voltage $V_b$ is higher than the threshold voltage $V_{th}$, it is determined that the battery module 180 is connected to the portable electronic device 100.

When the microcontroller 126 determines that the battery module 180 is coupled to the portable electronic device 100, the LCD panel is lightened in subsequent steps and the startup procedure is also completed thereafter. Otherwise, when the microcontroller 126 determines that the battery module 180 is not coupled to the portable electronic device 100, the foregoing steps of detecting whether the battery module is coupled to the portable electronic device 100 are repeated, and the LCD panel would be lightened and the startup procedure would be completed as well until the microcontroller 126 determines the battery module 180 is coupled to the portable electronic device 100.

Figure 2:
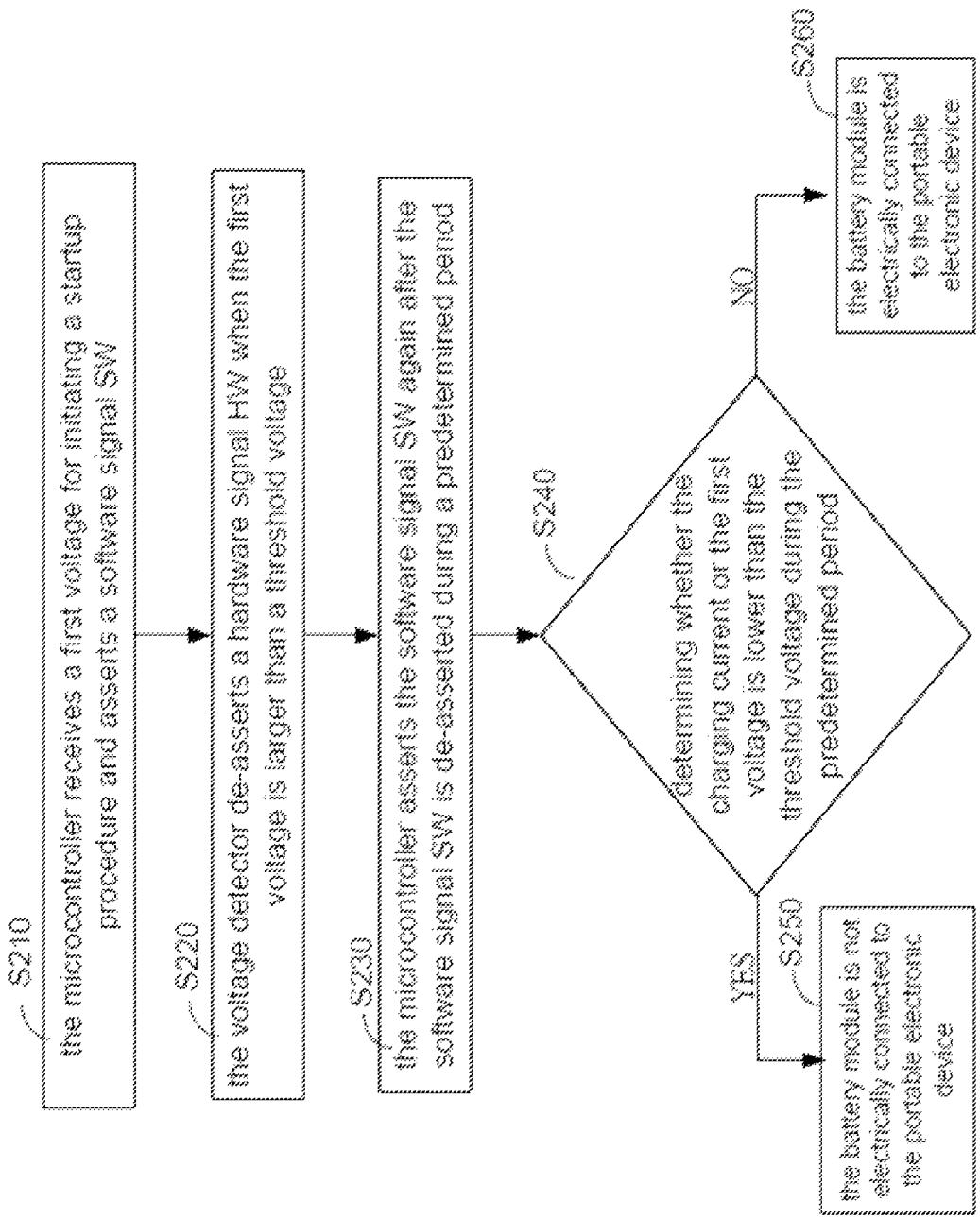
FIG. 2 is a flow chart of a battery detecting method in accordance with an embodiment of the present disclosure.

FIG. 2 is a flow chart of a battery detecting method for the foregoing battery detector in accordance with an embodiment of the present disclosure. In Step S210, the microcontroller 126 receives a first voltage for initiating a startup procedure, and asserts a software signal SW. In Step S220, the voltage detector 124 de-asserts a hardware signal HW when the first voltage is larger than a threshold voltage. In Step S230, after the software signal SW is de-asserted during a predetermined period, the microcontroller 126 asserts the software signal SW again. In Step S240, during the predetermined period, determining whether the charging current or the first voltage is lower than the threshold voltage. In Step S250, when the charging current or the first voltage is lower than the threshold voltage, it is determined that the battery module is not coupled to the portable electronic device. Otherwise, in Step S260, when the charging current or the first voltage is not lower than the threshold voltage, it is determined that the battery module is coupled to the portable electronic device.

According to one embodiment of the present disclosure, the enable control circuit 106 is an AND gate, and the enable signal EN is configured at logic low level for controlling the MOS to switch into the close state when either the hardware signal HW or the software SW is at logic low level.

According to above embodiments of the present disclosure, the portable electronic device 100 capable of detecting a battery module without an ID terminal is disclosed. In the same manner, a detector and method thereof disclosed by the present disclosure can also apply to detect a battery module with an ID terminal. In addition, without the current detector 122 and the detecting resistor $r_d$, the portable electronic device 100 can also determine whether the battery module 180 is coupled to the portable electronic device 100 through the voltage detector 124 according to variations of the voltage $V_b$.

In conclusion, according to the present disclosure, a battery detector of a handheld electronic apparatus and method thereof is applied to a battery module without an ID terminal. When the handheld electronic apparatus receives the DC voltage provided by an external transformer, the handheld electronic apparatus can still detect whether the battery module is coupled to the handheld electronic apparatus and prevent generating erroneous operations.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A battery detector for a portable electronic device, the battery detector comprising:
   a charger configured to receive a direct current (DC) voltage from an external transformer;
   a metal-oxide-semiconductor (MOS) switch, coupled between the charger and a voltage detector, that configures an electrical connection state between the charger and the voltage detector as a closed state or an open state according to an enable signal generated by an AND gate;

the voltage detector, coupled to the MOS switch and the AND gate, that provides a first signal at a logic-high level to the AND gate when a voltage detected by the voltage detector is higher than a threshold voltage, and that provides the first signal at a logic-low level to the AND gate when the voltage detected by the voltage detector is lower than the threshold voltage;

a microcontroller, coupled to the voltage detector and the AND gate, that provides a second signal at the logic-low level to the AND gate, and, after providing the second signal at the logic-low level to the AND gate, that provides the second signal at the logic-high level to the AND gate for a predetermined period of time; and the AND gate that receives the first signal from the voltage detector and the second signal from the microcontroller, and that generates the enable signal at the logic-low level to control the MOS switch to switch into the closed state when the first signal is at the logic-low level or the second signal is at the logic-low level;

wherein the microcontroller determines that a battery module is not coupled to the portable electronic device when the voltage detected by the voltage detector, during the predetermined period of time, is lower than the threshold voltage, and determines that the battery module is coupled to the portable electronic device when the voltage detected by the voltage detector, during the predetermined period of time, is not lower than the threshold voltage.

2. The battery detector of claim 1, further comprising:

a detecting resistor, wherein the MOS switch is coupled to a first end of the detecting resistor, and wherein the voltage detector is coupled to a second end of the detecting resistor; and a current detector, coupled to the first end and the second end of the detecting resistor, that detects a charging current of the detecting resistor;

wherein the microcontroller is further coupled to the current detector and determines that the battery module is not coupled to the portable electronic device when the current detector detects the charging current of the detecting resistor is generated, and determines that the battery module is coupled to the portable electronic device when the current detector detects the charging current of the detecting resistor is not generated.

3. A battery detecting method for a portable electronic device, the method comprising:

receiving, by a charger, a direct current (DC) voltage from an external transformer;

configuring, by a metal-oxide-semiconductor (MOS) switch coupled between the charger and a voltage detector, an electrical connection state between the charger and the voltage detector as a closed state or an open state according to an enable signal generated by an AND gate;

providing, by the voltage detector coupled to the MOS switch and the AND gate, a first signal at a logic-high level to the AND gate in response to a voltage detected by the voltage detector being higher than a threshold voltage;

providing, by the voltage detector coupled to the MOS switch and the AND gate, the first signal at a logic-low level to the AND gate in response to the voltage detected by the voltage detector being lower than the threshold voltage;

providing, by a microcontroller coupled to the voltage detector and the AND gate, a second signal at the logic-low level to the AND gate;

after providing the second signal at the logic-low level to the AND gate, providing, by the microcontroller, the second signal at the logic-high level to the AND gate for a predetermined period of time;

receiving, by the AND gate, the first signal from the voltage detector and the second signal from the microcontroller;

generating, by the AND gate, the enable signal at the logic-low level to control the MOS switch to switch into the closed state when the first signal is at the logic-low level or the second signal is at the logic-low level;

determining, by the microcontroller, that a battery module is not coupled to the portable electronic device in response to the voltage detected by the voltage detector, during the predetermined period of time, being lower than the threshold voltage; and determining, by the microcontroller, that the battery module is coupled to the portable electronic device in response to the voltage detected by the voltage detector, during the predetermined period of time, being not lower than the threshold voltage.

4. The battery detecting method of claim 3, further comprising:

determining, by the microcontroller, that the battery module is not coupled to the portable electronic device in response to a current detector detecting that a charging current of a detecting resistor is generated; and determining, by the microcontroller, that the battery module is coupled to the portable electronic device in response to the current detector detecting that the charging current of the detecting resistor is not generated;

wherein the MOS switch is coupled to a first end of the detecting resistor and wherein the voltage detector is coupled to a second end of the detecting resistor; and wherein the current detector is coupled to the first end and the second end of the detecting resistor.

* * * * *